United States Patent [19]
Saxe

[11] 4,055,893
[45] Nov. 1, 1977

[54] SABER SAW CONTROL HANDLE

[76] Inventor: Leo C. Saxe, 10907 Annapolis Rd., Bowie, Md. 20716

[21] Appl. No.: 677,533

[22] Filed: Apr. 16, 1976

[51] Int. Cl.² .................. B27B 11/00; B27B 19/09
[52] U.S. Cl. ................................................ 30/392
[58] Field of Search ............... 30/392, 393, 394, 374; 83/747

[56] References Cited
U.S. PATENT DOCUMENTS
3,448,781  6/1969  Angelucci ........................... 30/392

Primary Examiner—Jimmy C. Peters
Attorney, Agent, or Firm—Blair & Brown

[57] ABSTRACT

A control handle for saber saws for turning the saw about the axis of reciprocation of the saw using a rotating handle having its axis parallel to the work surface and perpendicular to the axis of reciprocation of the saw blade. The control handle is the main handle for manipulating the saw and is mechanically linked to the saber saw blade to permit the saw blade to be guided by rotation of the handle. A transversely extending shaft parallel to the work surface is also linked to the saber saw blade and has knobs on its opposite ends so that the blade may be guided therewith.

2 Claims, 5 Drawing Figures

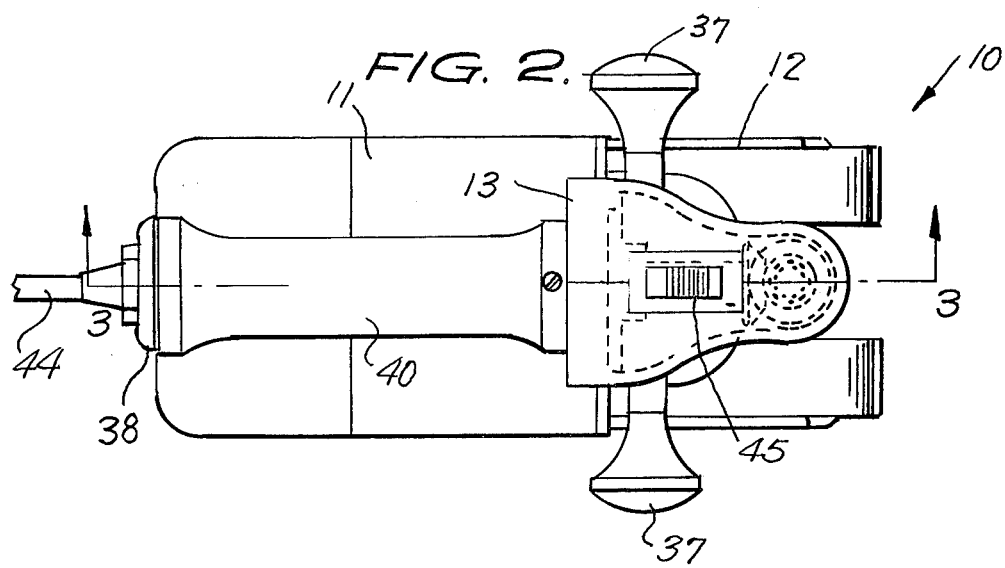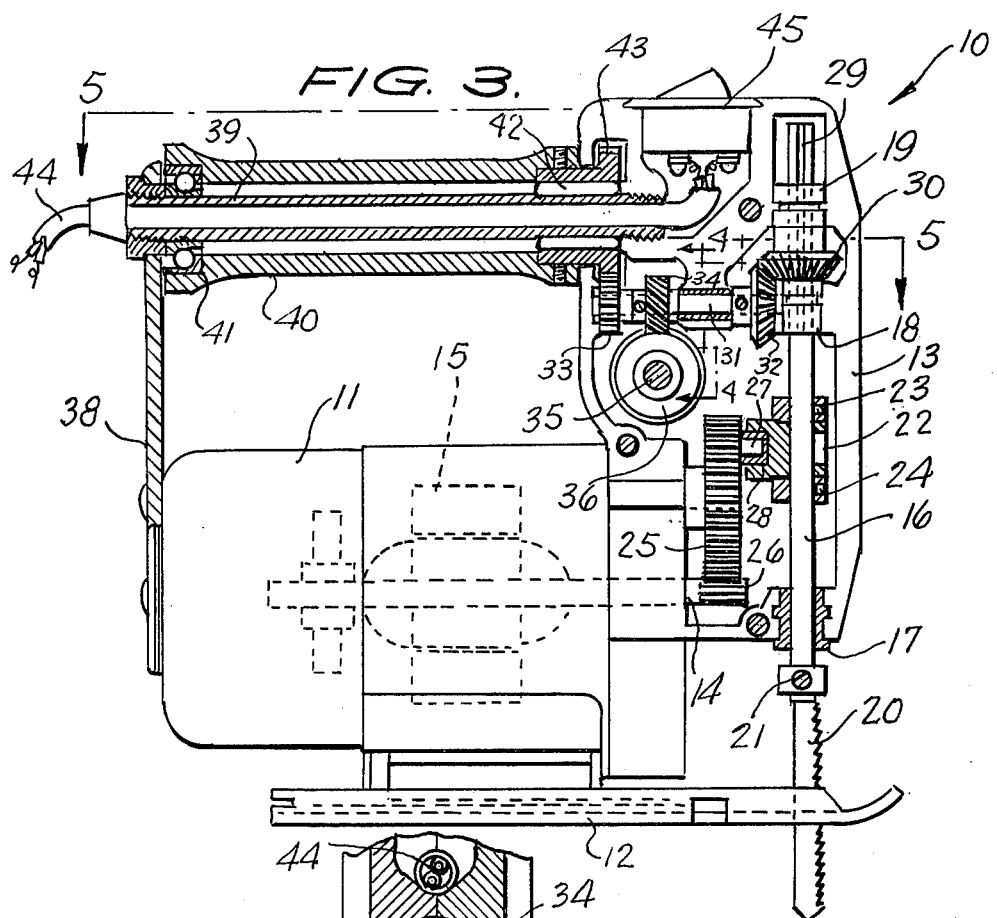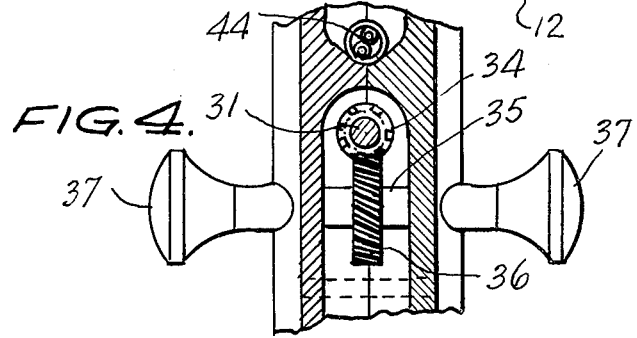

SABER SAW CONTROL HANDLE

BACKGROUND OF THE INVENTION

FIELD OF THE INVENTION

The present invention relates to saber saw blade control mechanisms for guiding the blade.

SUMMARY OF THE INVENTION

The guiding handle mechanism of the present saber saw blade control includes a handle having its axis perpendicular to the axis of the blade reciprocation and mounted for rotation. The handle is linked to the blade mounting so that rotation of the handle about it axis causes rotation of the blade about the axis of reciprocation so as to guide the blade through the work.

The primary object of the invention is to provide a saber saw blade guide control in which the manipulating handle can be turned about its axis to turn the blade about the axis of reciprocation.

Other objects and advantages will become apparent in the following specification when considered in light of the attached claims.

BRIEF DESCRIPTION OF THE DRAWINGS

FIG. 3 is a vertical sectional view taken along the line 3—3 of FIG. 2 looking in the direction of the arrows;

FIG. 4 is an enlarged fragmentary transverse sectional view taken along the line 4—4 of FIG. 3 looking in the direction of the arrows; and FIG. 5 is a fragmentary horizontal sectional view taken along the line 5—5 of FIG. 3 looking in the direction of the arrows.

DESCRIPTION OF THE PREFERRED EMBODIMENT

Figure 1:
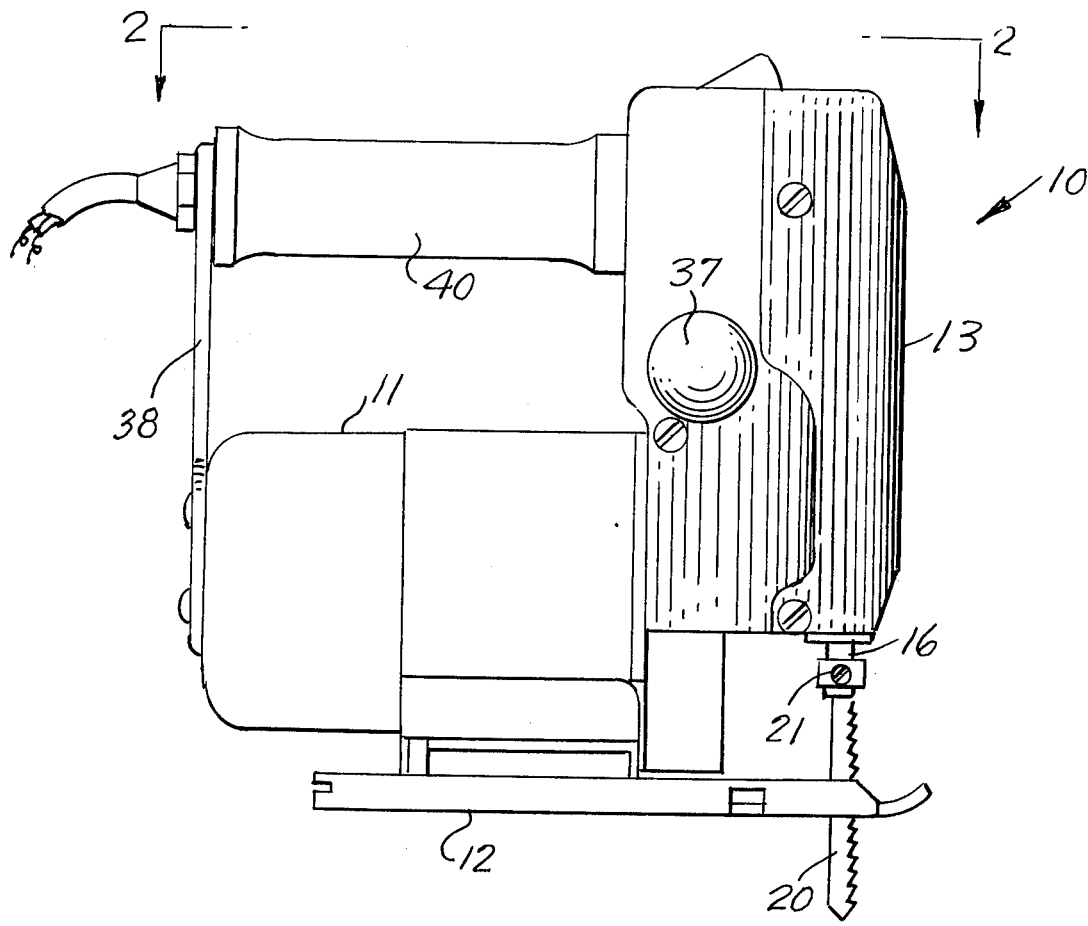
FIG. 1 is a side elevation of the invention.
Figure 2:
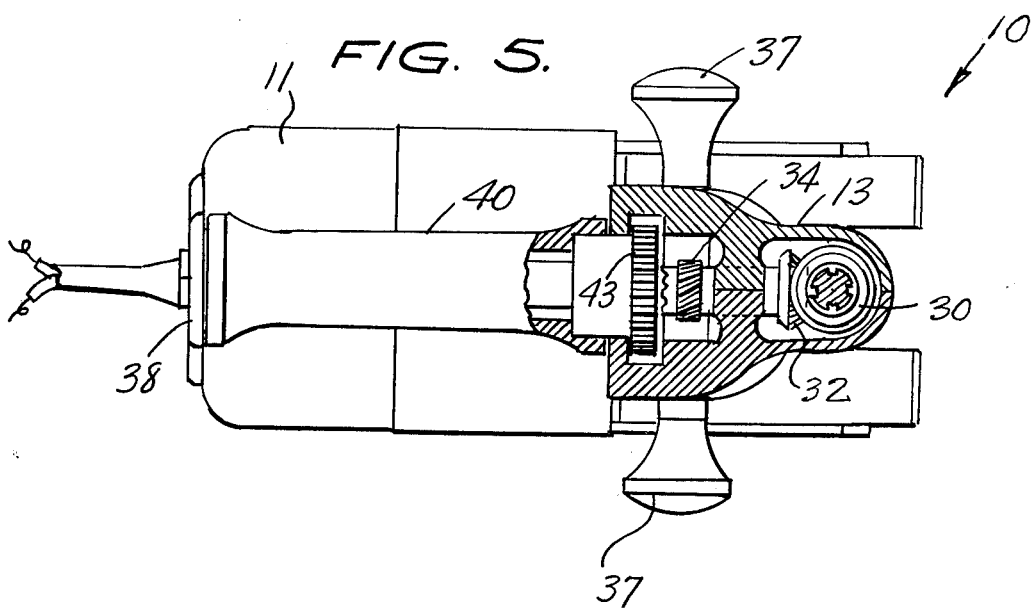
FIG. 2 is a top plan view of the invention.

Referring now to the drawings in detail wherein like reference characters indicate like parts throughout the several figures, the reference numeral 10 indicates generally a saber saw constructed in accordance with the invention.

The saber saw 10 includes a motor housing 11 having a base plate 12 secured thereto for engaging the work. A drive housing 13 is secured to one end of the motor housing 11 and a motor drive shaft 14 extends from a motor 15 in the housing 11 into the housing 13.

A vertically reciprocating shaft 16 is mounted in a bushing 17 at the lower end of the housing 13, a bushing 18 spaced thereabove and an upper bushing 19 also mounted in the housing 13 supporting the shaft 16 for vertical movement. A saw blade 20 is secured in the lower end of the shaft 16 by a screw 21.

A coupling 22 is mounted on the shaft 16 between a pair of collars 23-24 with the shaft 16 being able to rotate within the coupling 22. A spur gear 25 is mounted for rotation within the housing 13 and meshes with a gear 26 on the end of the motor shaft 14. An eccentric drive pin 27 is mounted on the spur gear 25 and engages through a bushing 28 into the coupling 22 in order to drive the coupling 22 vertically as the gear 25 rotates.

The shaft 16 is splined as at 29 on its upper end portion and has a bevel gear 30 mounted thereon engaging the splines 29 so that rotation of the gear 30 will rotate the shaft 16. The shaft 16 may reciprocate in the spur gear 30 when the gear 25 is rotated. A shaft 31 is mounted in the housing 13 with its axis perpendicular to the axis of the shaft 16. A bevel gear 32 is secured to one end of the shaft 31 with the bevel gear 32 meshing with the bevel gear 30. A spur gear 33 is secured to the shaft 31 at the rear end thereof. A worm gear 34 is mounted intermediate of the shaft 31 as can be best seen in FIG. 3.

A shaft 35 extends through the housing and is mounted for rotation therein carrying a worm gear 36 intermediate its opposite ends. Knobs 37 are secured to opposite ends of the shaft 35 by any suitable means including disconnect clutches. The worm gear 36 meshes with the worm gear 34 so that rotation of the shaft 35 will rotate the shaft 31.

A bracket 38 is secured to the motor housing 11 at the end thereof opposite the housing 13 and extends upwardly therefrom to support one end of a hollow shaft 39 the other end of which is supported in the housing 13. A hollow handle 40 is mounted on a ball bearing 41 at one end and by a ball bearing 42 at its opposite end to permit it to rotate freely. A spur gear 43 is secured to the handle 40 to rotate therewith and is meshed with the spur gear 33 so that rotation of the handle 40 will rotate the shaft 31 to guide the blade 20.

An electric cable 44 extends from a source of electricity through the hollow shaft 39 to a control switch 45 mounted on top of the housing 13.

In the use and operation of the invention the handle 40 is rotated about its axis as the saw is moved through the work to rotate the shaft 16 and hence the blade 20 so as to carefully guide the blade 20 through the work. In situations where a very precise control of the blade is required the knobs 27 can be used by either a right or left hand user to rotate the shaft 16 and control the guiding of the blade 20.

While no specific releasable lock has been illustrated to lock the handle 40 against rotation it should be understood that any suitable locking mechanism may be utilized as desired.

Having thus described the preferred embodiment of the invention it should be understood that numerous structural modifications and adaptations may be resorted to without departing from the spirit of the invention.

I claim:

1. A saber saw including a motor housing, a drive housing, a motor in the motor housing, a saber saw blade shaft mounted for reciprocation in the drive housing, means on the lower end of the saw shaft for securing a saber saw blade thereto, means extending from the motor housing to the drive housing for vertically reciprocating the saw shaft and saber saw blade secured thereto, said last mentioned means comprising a spur gear rotated by the gear on the end of the shaft of the motor, the spur gear causing a single eccentric drive pin mated therewith to impart vertical reciprocal motion to the saw shaft through a bushing and a coupling, a handle having its axis substantially parallel to the work surface and substantially perpendicular to the axis of reciprocation of the saw shaft, a transverse shaft extending through said drive housing, and means in the drive housing for linking both said handle and said transverse shaft to the reciprocating saber saw shaft to rotate the saw shaft upon rotation of said handle or said transverse shaft or both.

2. The device of claim 1 in which said means for rotating said saber saw includes a gear drive.

* * * * *